Patented May 20, 1930

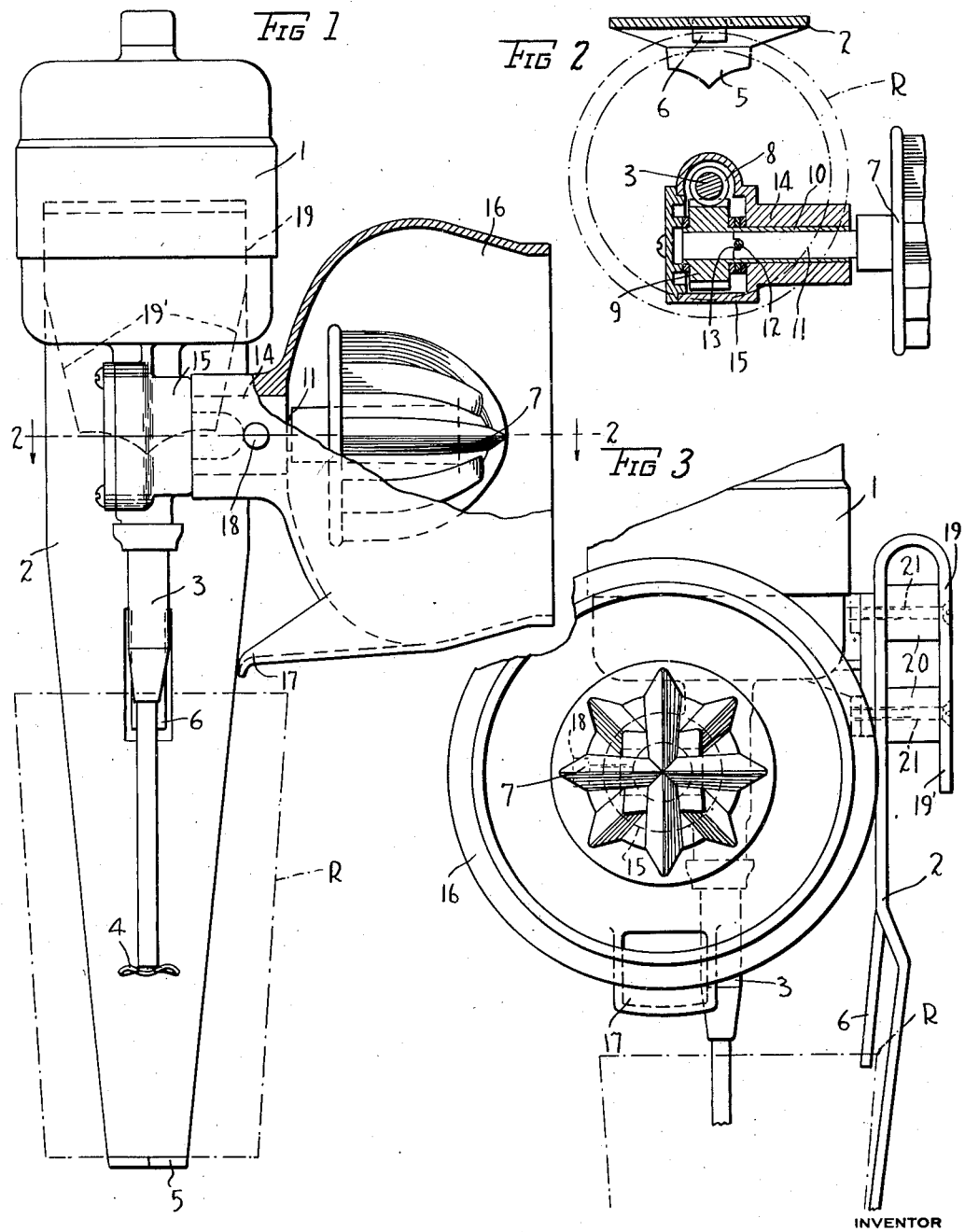

1,759,760

UNITED STATES PATENT OFFICE

CLARENCE RINGWALD, OF NORTH HAMPTON, OHIO, ASSIGNOR TO ROBBINS & MYERS, INC., OF SPRINGFIELD, OHIO, A CORPORATION OF OHIO

COMBINED JUICE EXTRACTOR AND MIXER

Application filed August 30, 1929. Serial No. 389,438.

This invention relates to a combined juice extracting and mixing machine.

An object of my invention is to provide a juice extracting device and a mixing device so combined and associated that the juice from the extracting device may be delivered into a receptacle which is positioned in operative relation with the mixing device so that the operation of extracting the juice and mixing the same with other ingredients may be simultaneously performed.

A further object of my invention is to combine a juice extractor and mixer in a unitary structure so arranged that power may be applied to each from a common motor.

Other objects of the invention will appear from the accompanying description.

Fig. 1 is a front elevation of a machine in which my improvements are embodied.

Fig. 2 is a transverse section on the line 2—2 of Fig. 1.

Fig. 3 is a side elevation of a portion of the machine.

Referring to the drawings, 1 is an electric motor which is secured in any suitable way to a bracket 2. The shaft 3 of the motor extends downwardly and to its lower end is fastened an agitator or mixer 4 of any suitable form. The extreme lower end of the bracket has an outturned ledge 5 to form a rest for the receptacle R which is shown as a tumbler of well known form, the tumbler being retained on this ledge by inserting the upper edge thereof under a downwardly depending offset tongue 6 which is cut and pressed from the bracket.

The juice extractor is shown as a reamer 7 of well known form. This reamer is horizontally arranged and is driven from the motor shaft 3 through the medium of a worm 8 on said shaft, worm wheel 9, hollow shaft 10 connected therewith, shaft 11 connected with the reamer and a pin and groove connection shown at 12 and 13 between the two shafts. The shaft 10 is mounted in a bearing 14 which extends horizontally from the gear housing 15, which is connected with the lower head of the motor.

A collector bowl 16 having a discharge spout 17 at its lower end has a hub portion which fits over the bearing 14 and is secured thereto by a set screw 18. The spout projects laterally from the inner side of the bowl to a position to discharge the juice into the receptacle R when in position on the bracket.

By this arrangement it will be seen that a combined juice extractor and agitating device are incorporated in a single unitary structure with the parts so assembled and associated that the juice from the extractor may be discharged into a receptacle which is supported in operative relation with the agitator. The agitator or mixer of course rotates at a high speed while the ratio of the gearing is such that the reamer rotates at a comparatively low speed. By reason of the connection described between the shafts 10 and 11 the reamer may be readily removed for cleaning purposes. A device may be supported at any suitable point, preferably by providing the upper end of the bracket with the shank 19 which projects in parallel and spaced-apart relation with the rear side thereof with its sides inclined as indicated at 19' in Fig. 1 so as to fit a socket member provided with tapered ways (not shown in the present case).

The bracket and its shank member are held in spaced-apart relation by blocks 20 which are secured in position by screws shown in dotted lines at 21, which screws also serve the purpose of securing the bracket and motor together.

Having thus described my invention, I claim:

1. In a combined juice extracting and mixing machine, a support, an electric motor mounted on said support, a mixing member connected with the shaft of said motor, a juice extracting member operatively connected with the shaft of said motor, means for supporting a receptacle in operative relation with said mixer, and means for discharging juice from said extractor into said receptacle while so supported.

2. In a combined juice extractor and mixing machine, a support and electric motor mounted on said support, a mixing member connected with the shaft of said motor, a juice extracting member operatively connected with the shaft of said motor, means for supporting a receptacle in operative relation with said mixer, a bowl-like member arranged about said juice extracting member, and a spout leading from said bowl member to said receptacle while so supported.

3. In a combined juice extractor and mixing machine, a support, an electric motor mounted on said support with its shaft depending downwardly, a mixing member connected with the lower end of the shaft of said motor, means for supporting a receptacle in operative relation with said mixing member, a horizontally-arranged juice extracting member, together with means for rotating the same from said motor shaft, a bowl surrounding said juice extracting member open at its outer side, and a spout leading from the lower portion of said bowl to said receptacle while so supported.

4. A support, an electric motor and its shaft mounted on said support, a mixing member operatively connected with said shaft, and a juice extracting member mounted upon said support and operatively connected with the shaft of said motor, and means for supporting a receptacle in operative relation with both the mixing member and the juice extracting member.

5. In a combined juice extractor and mixing machine, a support, an electric motor mounted on said support, a mixing member connected with the shaft of said motor, a juice extracting member supported by said motor comprising a rotary reamer and a bowl surrounding said reamer, speed-reducing gearing between the shaft of said motor and said reamer, means for supporting a receptacle in operative relation with said mixing member, and a spout leading from the lower portion of said bowl to a point above said receptacle while so supported.

6. In a combined juice extractor and mixing machine, a support, an electric motor mounted on the upper end of said support with its shaft vertically disposed, a mixing member connected with the lower end of the shaft of said motor, a horizontally-disposed bearing at the lower end of said motor, a juice extracting member comprising a rotary reamer, a shaft for said reamer and a bowl, said reamer shaft being journalled in said bearing and operatively connected with the motor shaft, a hub on said bowl fitted to the exterior of said bearing, means for supporting a receptacle in operative relation with said mixing member and a spout leading from the lower portion of said bowl to a point above said receptacle while so supported.

In testimony whereof, I have hereunto set my hand this 22nd day of August, 1929.

CLARENCE RINGWALD.